US Patent [19] Johnston

[11] 4,270,762
[45] Jun. 2, 1981

[54] DISPERSER SEAL AND METHOD

[75] Inventor: Robert T. Johnston, Dearborn Heights, Mich.

[73] Assignee: Coaltek Corporation, Pittsburgh, Pa.

[21] Appl. No.: 927,766

[22] Filed: Jul. 25, 1978

Related U.S. Application Data

[63] Continuation of Ser. No. 793,450, May 3, 1977, abandoned.

[51] Int. Cl.³ .................... F16J 15/40; F16J 15/26
[52] U.S. Cl. .................................... 277/59; 277/102
[58] Field of Search ................ 277/102, 230, 59, 41

[56] References Cited

U.S. PATENT DOCUMENTS

| | | |
|---|---|---|
| 3,403,915 | 10/1968 | Roberts . |
| 3,474,734 | 10/1969 | Stogner ................................ 277/59 |
| 3,512,723 | 5/1970 | Geoffroy . |
| 3,575,426 | 6/1968 | Durham ................................ 277/59 |
| 3,646,846 | 3/1972 | Houghton et al. . |
| 3,943,717 | 3/1976 | Schexnayder ........................ 277/59 |
| 4,094,513 | 6/1978 | Kime et al. .......................... 277/41 |

Primary Examiner—Robert I. Smith
Attorney, Agent, or Firm—Buell, Blenko, Ziesenheim & Beck

[57] ABSTRACT

A seal for a shaft of a disperser crusher, that pulverizes hot coal particles, maintains a higher than atmospheric pressure within a casing for the crusher, and is able to withstand elevated temperatures that are produced within the casing. The pressure and temperature result from hot gases that convey coal particles to the crusher. The seal includes self lubricating graphite packings that are urged in abutting relation with a smooth, ceramic sleeve on the shaft and are able to withstand the temperature on the shaft surface. A first, interior packing is on the inside of a wall of the casing while a second, exterior packing is outside of the wall. Superheated steam, a gas inert with the coal particles, is supplied to the interior packing with sufficient pressure to substantially prevent the migration of coal particles through the interior packing. The tendency of the coal particles to migrate from the container through the interior packing is further inhibited by providing a tortuous path from the casing to the interior packing.

16 Claims, 3 Drawing Figures

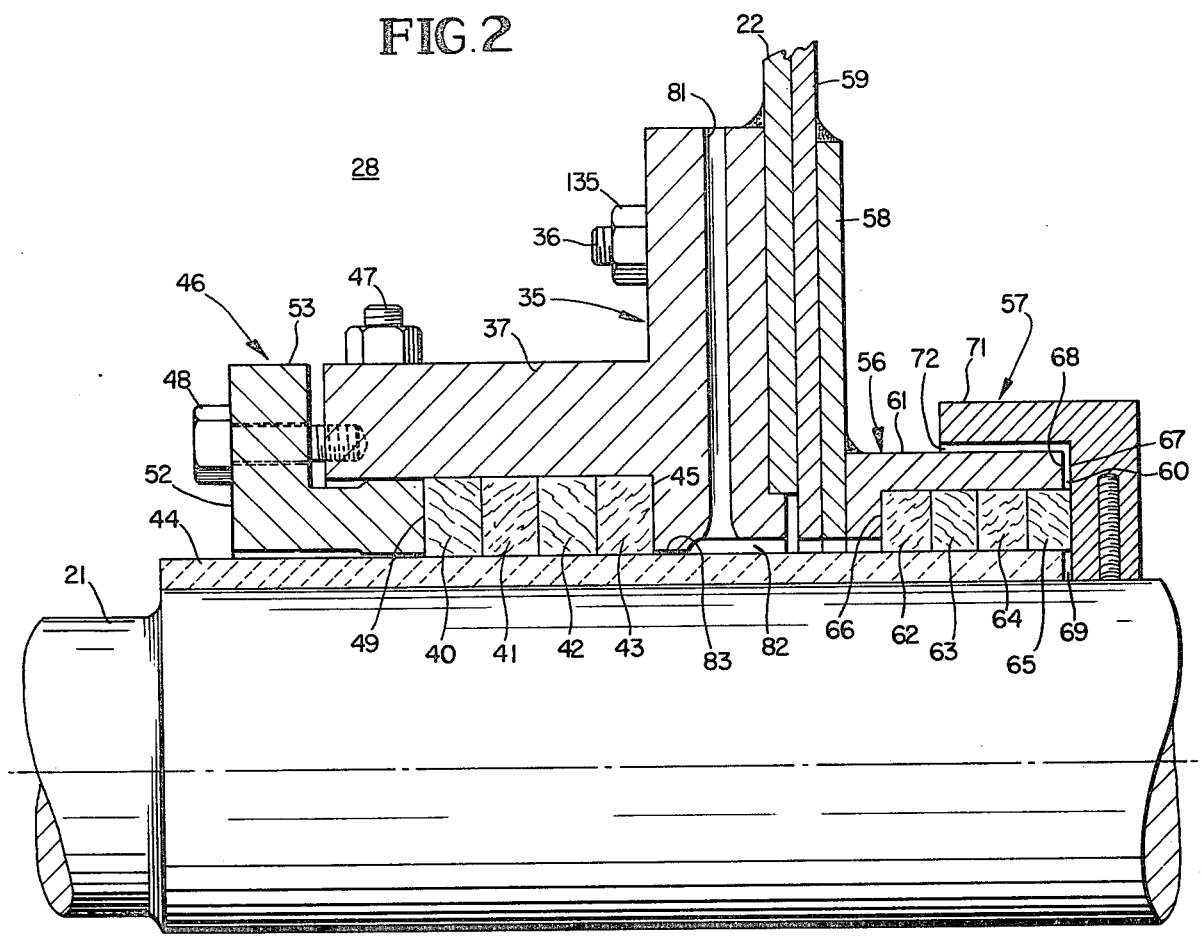
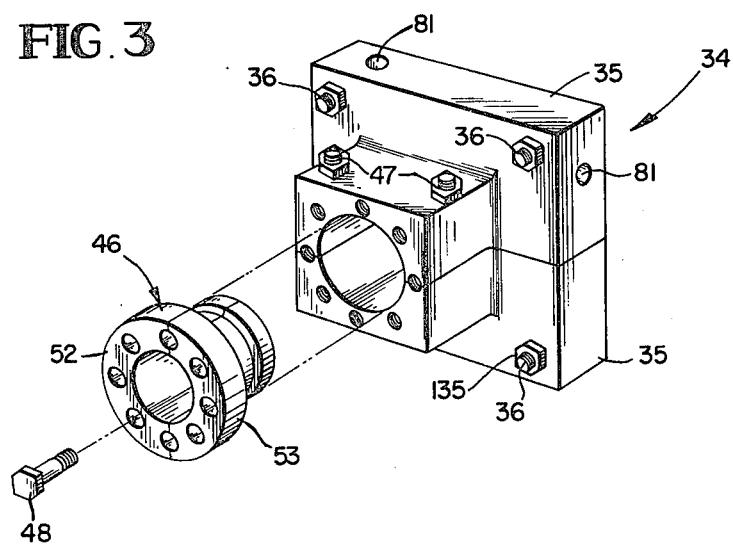

DISPERSER SEAL AND METHOD

This application is a continuation of my copending application Ser. No. 793,450, filed May 3, 1977 and now abandoned.

FIELD OF THE INVENTION

The present invention relates generally to shaft seals, and more particularly, to a shaft seal including packings inside and outside of a casing wall through which the shaft extends, in combination with a source of fluid pressure that prevents migration of particles from the casing through the packing.

BACKGROUND OF THE INVENTION

The advantages of charging coking chambers with coal preheated to a temperature such that the coal is completely dry and below the temperature at which the coal is in a plastic state has long been recognized. Typically, the coal is preheated and pulverized, prior to being supplied to a pipeline that supplies the coking chambers, in a sealed assembly known as a disperser crusher. The coal is conveyed to the disperser crusher by hot gases and in the crusher is pulverized by a number of rotating hammers that are mounted on a common driven shaft that extends horizontally through a casing for the assembly. The disperser crusher is maintained at a pressure of approximately 2 psi above atmospheric and a temperature of about 500° F. (approximately 575° F. maximum) in response to the hot conveying gases and the sealed conditions of pipelines from the hot gas source to the coke oven.

To maintain the superatmospheric pressure within the disperser crusher, it is necessary for shaft seals to be provided in the casing wall for the drive shaft of the hammers. The shaft seal must be capable of withstanding the temperature on the shaft surface, which may rise to as much as 700° F. because of the temperature in the disperser crusher and the frictional heating of the shaft. It is particularly important to keep coal particles that are flung in many different directions by hammers away from sealing members and surfaces to prevent wear. It is also important to prevent charring of the coal particles by air. If the coal particles become oxidized, they become charred. The accumulation of the oxidized particles, in particular, around the seal tends to destroy the seal integrity.

In the past, a seal for the shaft of a disperser crusher employed a single packing outside of the casing wall for the disperser crusher. The prior art packing included a minimum of three Teflon-asbestos packing rings, each having a radial thickness on the order of $\frac{3}{8}$ inch, and longitudinally disposed along the shaft. The seal must be lubricated by grease, and to this end, the packing and lubricant must be located far enough from the exterior wall of the disperser crusher to prevent destruction of the lubricant by heat conducted through the shaft when the disperser crusher is operating at maximum temperature.

An annular chamber, provided between the seal and casing wall, is pressurized with air from an external source. The annular chamber is in fluid flow relation with the inside of the casing through a relatively close clearance hole around the shaft. The air flowing through the chamber ostensibly cleans the shaft to prevent migration of coal particles from the disperser to the packing. In actual practice, however, the prior art seal is not effective to maintain a pressurized condition within the disperser crusher for any prolonged time interval. None of the prior art seals has been able to maintain the desired pressure within the disperser crusher for more than four months, and some of the seals have been effective for only one week.

The ineffectiveness of the prior art seal can be attributed to many factors. In particular, the $\frac{3}{8}$ inch external packing has been found to be excessively flexible and has caused the shaft to distort, resulting in a run out of from 0.015 to 0.20 inches. Charred coal from the disperser crusher migrates to and destroys the packing as well as a low coefficient of friction sleeve on the shaft, against which the packing abuts. The coal is charred because it is oxidized by air migrating through the clearance hole and because the internal pressure within the disperser crusher expels the charred coal particles from the disperser crusher axially of the shaft into contact with the coating and packing.

Another problem with the prior art seal is that shims are necessary to align the shaft. However, when the disperser crusher is shut down, for shaft alignment, the temperature of the shaft decreases, because of the lower temperatures within the disperser crusher. When the disperser crusher is stopped and the unit is cooling down the shaft sags and upon restarting, due to the sag in the shaft, misalignment between the shaft and packing occurs resulting in wearing of the packing.

A further problem with the prior art seal is that the packing requires lubrication by maintenance personnel. It has been found that the human factor involved in performing the lubrication frequently causes the packing to become dry, causing wear between the packing and shaft sleeve.

It is, accordingly, an object of the present invention to provide a new and improved shaft seal, particularly adapted to be utilized in connection with a disperser crusher that pulverizes hot coal particles.

Another object of the invention is to provide a new and improved seal for a shaft of a disperser crusher wherein the seal is not susceptible to destruction due to coal particles that are flung in many directions by the hammers of the disperser crusher.

Another object of the invention is to provide a new and improved seal for a shaft of a disperser crusher wherein the seal includes packings that are rigid enough to prevent possible distortion of the shaft carrying hammers.

A further object of the invention is to provide a new and improved seal for a shaft of a disperser crusher, which seal does not require lubrication.

A further object of the invention is to provide a new and improved seal for a shaft of a disperser crusher, which seal does not have an effect on the shaft alignment.

BRIEF DESCRIPTION OF THE INVENTION

In accordance with the present invention, a new and improved shaft seal, particularly adapted for the shaft of a disperser crusher, includes first and second packings on the interior and exterior of a casing wall of the disperser crusher. By employing interior and exterior packings, the seal is sufficiently rigid to prevent shaft distortion. Both packings are radially urged against a ceramic, low friction outer layer on the shaft. The packings are fabricated of a self-lubricating material capable of withstanding the temperature on the surface of the shaft, such as a braided, solid filament packing graphite that does not include any material (such as Teflon) which can break down at the approximately 700° F. maximum shaft temperatures. The interior packing is pressurized and urged away from the interior wall of the casing by a gas that is inert with the coal particles. The gas has a pressure greater than the pressure inside of the container to prevent migration of the coal particles through the packing, and thereby reduce wear between the packing and the shaft coating. Preferably, the inert gas is superheated steam, which in addition to being inert with the coal particles to prevent oxidation and charring thereof, is dry so it does not condense on or oxidize the seal or shaft or cause caking of the packing.

In accordance with a further feature of the invention, a tortuous path is provided for the coal particles inside the casing to a surface of the interior packing remote from the shaft. The entrance to the tortuous path from the casing interior is defined as a nozzle that directs the steam toward the casing so that the steam emerging from the nozzle is deflected away from the seal, thereby to further inhibit migration of coal particles toward the seal. Because the coal particles are not oxidized and have a difficult time migrating to the intersection between the coating on the shaft and the packing, the tendency for the coal particles to destroy the seal between the packing and shaft is, to a large extent, obviated.

As a further feature of the invention, the area of the interior packing at right angles to the shaft is appreciably less than the area of the exterior packing. This relationship between the areas of the two packings enables a greater compressive force, in the radial direction of the shaft, to be applied to the exterior packing than to the interior packing, which in turn tends to prevent coal particles from migrating from the interior of the disperser crusher to the interior packing.

As a further feature of the invention, the prior art alignment problems are avoided by providing a split plate assembly for securing the external packing in situ. The split plate assembly includes a pair of plates that are fixedly mounted on the exterior wall of the casing. Each plate includes an outwardly extending flange that is urged radially into an abutting relationship with the outer diameter of the packings. The exterior packing is urged inwardly, toward the casing wall, by an axially urged follower ring that is secured to the flange by a number of bolts or cap screws. The packing follower ring, as well as the split plate assembly, are split into a pair of diametric halves, with the split sections of the plate assembly and ring being positioned at right angles to each other.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

FIG. 2 is a side sectional view of a portion of a seal in accordance with the present invention; and FIG. 3 is a perspective view of a split plate assembly and packing follower ring of a seal in accordance with the invention.

DETAILED DESCRIPTION OF THE DRAWING

Figure 1:
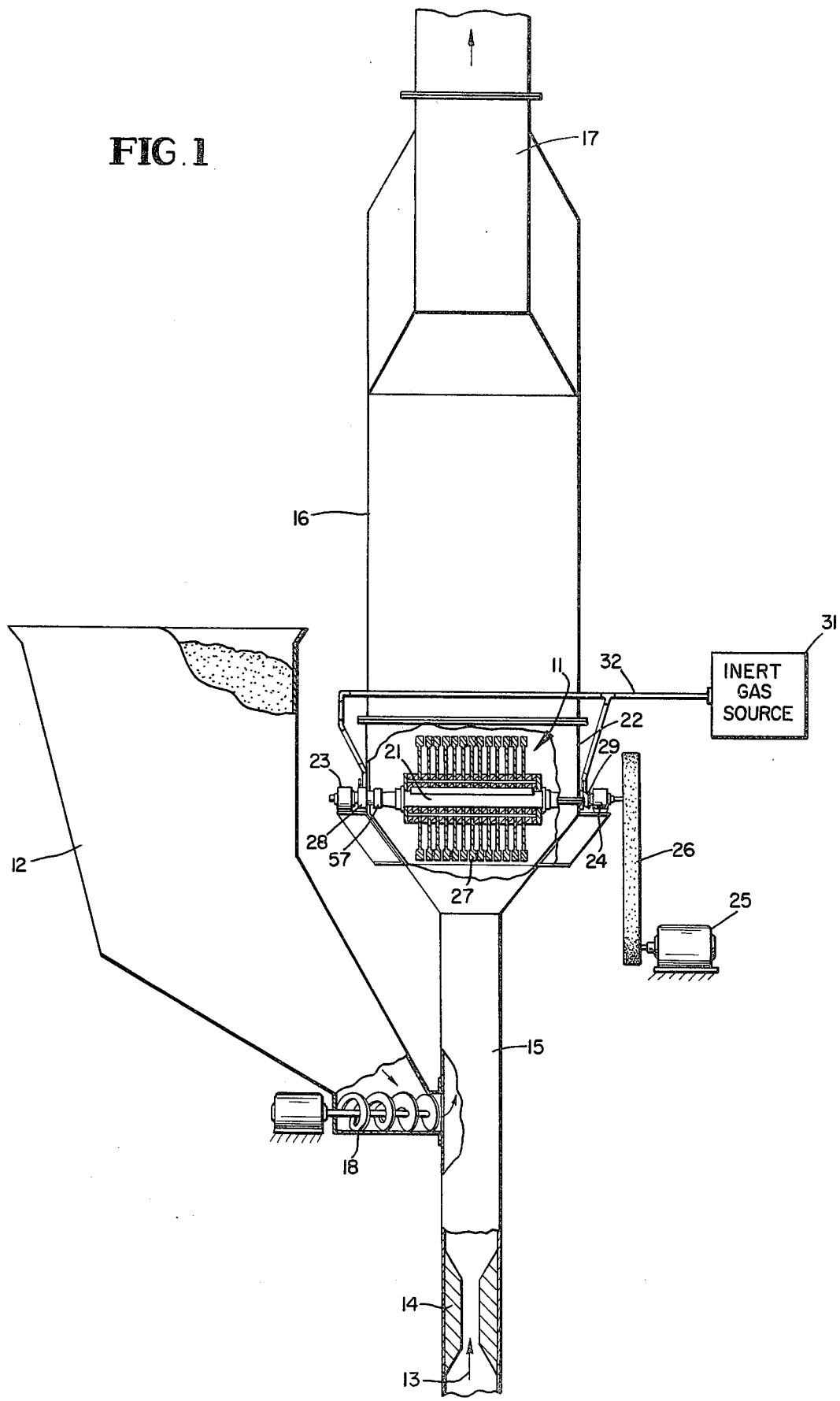
FIG. 1 is a schematic view of a disperser crusher employing the seal of the present invention.

Reference is now made to FIG. 1 of the drawing wherein there is schematically illustrated a disperser crusher 11 to which particles of coal from bin 12 are conveyed by hot gases derived from a combustion chamber (not shown); the gases flow from the chamber through line 13 and Venturi 14 to disperser crusher 11. The coal particles from bin 12 and the hot gases flowing through pipe 13 comingle in a drying zone 15, and thence are supplied to disperser crusher 11. From disperser crusher 11, the pulverized coal flows up through a gravity grading section 16, to column 17, which leads to a coke oven through a pipeline (not shown). Coal is supplied from bin 12 to drying zone 15 by any suitable means, such as motor driven auger 18. Typically, the temperature and pressure in disperser crusher 11 are approximately 500° F. and 2 psi above atmospheric, with a maximum temperature on the order of about 575° F.

Disperser crusher 11 includes a horizontal shaft 21 that extends through opposite sides of wall 22 that forms the disperser crusher casing. Shaft 21 is mounted on free bearing 23 and locked bearing 24, both of which are outside of the casing, on opposite sides of shaft 21. Shaft 21 is driven by motor 25, which is connected in driving relation with the shaft by belt 26 that is connected to a pulley (not shown) fixedly mounted on shaft 21.

Mounted on shaft 21, inside of casing wall 22, are radially extending hammers 27 that pulverize the coal particles supplied to the disperser crusher. Hammers 27 are axially located along shaft 21, in multiple parallel planes. At different equi-spaced arcuate positions of shaft 21, a different hammer rod is provided. The axial and arcuate spacing of hammers 27 is determined by spacers, in a manner well known to those skilled in the art. All of the elements of the disperser crusher apparatus described supra in connection with FIG. 1 are shown in part in U.S. Pat. No. 3,512,723.

In accordance with the present invention, improved shaft seals 28 and 29 are provided on opposite sides of shaft 21 against opposite sides of casing 22. Shaft seals 28 and 29 are effective over the operating temperature and pressure of disperser 11 to maintain the pressure within the disperser crusher at approximately 2 psi above atmospheric. Improved shaft seals 28 and 29 are able to withstand the maximum temperature of shaft 21, which may be as high as 700° F.; seals that have been in operation for almost one year have not failed. Shaft seals 28 and 29 are supplied with a dry gas that is inert with coal, i.e., does not oxidize when it contacts coal, by inert gas source 31 and conduits 32. Superheated steam is the preferred inert gas.

Each conduit 32 leads to four, mutually orthogonal openings in each of seals 28 and 29 to supply steam at a pressure appreciably greater than the pressure within disperser crusher 11; typically, the pressure of the steam in conduit 32 is about 25 psi above atmospheric. The pressure within conduits 32 can be maintained either manually, by monitoring a pressure gauge on the conduit, or automatically with a feedback controller responsive to a pressure transducer.

Details of one of seals 28 or 29 are illustrated in FIGS. 2 and 3. In the cross-sectional view of FIG. 2, the entire width of shaft 21 is illustrated, as well as the portion of the seal above the shaft center line. The seal includes portions interior and exterior of casing wall 22;

each of the portions includes packing rings that are urged radially against sleeve 44 on shaft 21, and which are sealingly connected from the outer circumferences thereof to casing 22 by fixed interior and exterior housings. The packing rings are pressurized by steam in conduits 32.

Reference is now made to FIGS. 2 and 3 of the drawing wherein the exterior portion of seal 28 is seen as comprising a split body mounting plate and seal assembly 34, in the form of mating, identically shaped housing segments 35, which are split along a horizontal axis. Mounting plate 34 is secured to the exterior of casing 22 of disperser crusher 11 by welding, as well as by nuts 135 on studs 36 that project from casing 22, to surround shaft 21 and a hole in the casing through which the shaft projects. Plate 34 includes an outwardly extending boss 37 having a circular interior face defining the outer surface of a gap between the boss and the perimeter of sleeve 44 on shaft 21.

In the gap between the outer surfaces of sleeve 44 and ring 37, three or four concentric self-lubricating, graphite packing rings are inserted; in the illustrated embodiment, four packing rings 40-43 are shown. Initially, however, only packing rings 41-43 are used, but after the seal has been in use for a week to ten days, packing rings 41-43 become compressed substantially in an axial direction towards face 45 at which time follower gland 46 is removed and an additional packing ring 40 is inserted adjacent packing ring 41. The inner surface of rings 40-43 abut against the smooth, low coefficient of friction, ceramic sleeve 44, fixed on the perimeter of shaft 21; the exterior surfaces of the packing rings abut against the interior face of ring 37. Sleeve 44 is snuggly fitted on shaft 21 throughout almost all of the length of the shaft that is susceptible to contact with parts of seal 28. Sleeve 44 must fit tight to shaft 21 so that the sleeve does not slip on the shaft as a result of contact between the sleeve and the interior surfaces of packings 40-43.

Sleeve 44 is formed from a core sleeve having a nominal, radial wall thickness of ⅜ inch with the outside surface of the core sleeve being coated with a ceramic coating. A suitable technique for applying a ceramic coating includes the so-called "Rokide" ceramic coating process, wherein the outside of the core is initially undercoated to a 0.002 thickness with Nichrome (a mixture of 80% nickel and 20% chrome) that is formed as a porous coating by a metallizing gun. The undercoated rod is then passed, at elevated temperature, through a metallizing gun at 140 psig, to form a final ceramic coating having a thickness of 0.010 inches, that is ground and sealed with silicone.

Each of packing rings 40-43 is a solid filament, graphite braided packing that is formed over a double fibrous core, formed of a material such as silk. One preferable form of graphite packing material, available from Garlock and known as Garlock Graphite-200 Modified is advantageous because it does not have a Teflon or wax carrier that is subject to breakdown at temperatures of about 700° F. Packing rings used in the crusher disperser must be able to withstand temperatures of at least 575° F. Because graphite packings 40-43 are inherently self-lubricating, there is no need to supply external lubricant to packing rings 40-43. In one preferred embodiment, each of packings 40-43 has a square, cross-sectional area of 1 in$^2$ in the planes extending radially and axially of shaft 21.

Packing rings 40-43 are held in situ radially and longitudinally of shaft 21 against the outer circumference of sleeve 44 and interior, vertical face 45 of housing 34 by packing follower ring 46 and bolted tie rods 47. Packing ring 46 is maintained in situ and is removably secured from the gap in which rings 40-43 are located by eight cap screws 48 that are equi-angularly displaced around ring 46 and extend axially of shaft 21 into threaded bores in the end of boss 37 remote from wall 22. Follower ring 46 abuts against the interior, circular face of boss 37 and is in close proximity with sleeve 44 to form a narrow gap between the ring and the sleeve. Similarly a narrow gap between surface 83 of plate 34 and the exterior of sleeve 44 exists adjacent face 45, inboard of packing ring 43. Face 49 of follower ring 46 abuts against packing ring 40. Tie rods 47 extend vertically through apertures in boss 37 to hold the seal together and secure packings 40-43 in proper relationship with sleeve 44.

As previously noted after the seal of the present invention has been utilized for a short period of time, packing rings 41-43 are compressed substantially in an axial direction, toward face 45, at which time it is advisable to remove follower gland 46 and insert an additional packing ring 40 adjacent packing ring 41. As illustrated in FIG. 3, packing follower ring 46 has a split configuration, including mating identical segments 52 and 53 having vertically extending, matching faces. Segments 52 and 53 are held in situ by the longitudinally directed force of cap screws 48 and the compressive force exerted on the the enlarged portions of rings 46 by the interior surfaces of bosses 37.

The interior portion of seal 28 includes a stationary, split body seal ring 56 and a rotating seal ring 57. Rings 56 and 57 are respectively fixedly mounted to casing 22 and shaft 21. Ring 56 is secured to casing 22 by welding the ring to inner seal mounting plate 58, preferably having a square exterior shape to facilitate installation. After ring 56 has been welded to plate 58, the ring and plate are fixed in situ by welding the plate to wear plate 59 that is secured to the interior face of wall 22; in fabricating the disperser crusher, it is common practice to fixedly mount a number of wear plates 59 on the interior face of wall 22.

Ring 56 includes an axially extending annular flange 61 that projects from mounting plate 58, inwardly toward the center of disperser crusher 11. A gap, typically having a radial thickness of ⅜ inch, is provided between the exterior of sleeve 44 and the interior face of flange 61. In the gap are placed four concentric packing rings 62-65, fabricated of the same material as packing rings 40-43. Each of packing rings 62-65 has a square cross-sectional area in planes at right angles to the axial and radial directions of shaft 21, with each side of the squares having a side ⅜ inch in length. Adjacent faces of packing rings 62-65 are in abutting relationship with each other, with the exterior face of ring 62 abutting against a vertical, interior face 66 of stationary ring 56, and the exterior face of packing ring 65 in abutting relationship with vertical face 67 of rotating ring 57 that is carried by and fixedly secured to shaft 21 by set screws (not shown). There is contact between the rotary and stationary parts of the seal inside of casing 22 along the vertical, exterior face of packing ring 65 and the interior face 67 of rotating ring 57, as well as between the exterior surface of sleeve 44 and all of the annular surfaces of rings 62, 63, and 64 and a considerable portion of ring 65. A narrow, longitudinal gap 60, typically having an axial length on the order of 5 mils under cold conditions exists between the stationary, vertical wall 68 of flange 61 remote from casing 22 and wall 67 of rotating ring 57. There is a longitudinal gap 69, typically having a length of ⅛ inch, between face 67 and the end of sleeve 44 inside of casing 22 so that there is room for radial and longitudinal expansion of rings 62–65 to prevent binding.

Ring 57 includes an annular flange 71 having an inner, annular surface that is radially spaced from the exterior annular surface of flange 61 by a relatively short (such as 1/32 inch) gap 72. Gaps 60 and 72 establish a tortuous path for coal particles on the inboard side of casing 22 to the exterior, outer edge of packing ring 65 possibly exposed to the particles. It is therefore difficult for coal particles to migrate to wearing surfaces between packing rings 62–65, and the exterior of sleeve 44.

Superheated steam from source 31 and conduit 32 is supplied to the exterior surface of pad 62, adjacent face 66 of stationary ring 56, by four passageways 81 having circular cross sections and that extend radially of shaft 21 through seal housing 34. Passageways 81 are provided in housing 34 at mutually orthogonal positions, typically located so that each of the passageways is displaced 45° from the horizontal and vertical to provide relatively even distribution of steam into plate 34. All four of passageways 81 terminate in an annular cavity 82 that is provided between the exterior of sleeve 44 and the interior of segments 35 and ring 56, as well as circular openings in casing 22, mounting plate 58, and wear plate 59. Cavity 82 has a radial gap between rings 34 and 56 and plates 58 and 59 of approximately ⅛ inch, under cold conditions. Cavity 82 extends axially of sleeve 44 from a region to the left of passageway 81 (as viewed in FIG. 2) to the exterior face of ring 62. Between the left side of cavity 82 (as viewed in FIG. 2) and face 45 there is a very slight clearance between the interior, circular face 83 of segment 35 and the exterior of sleeve 44.

Because of the gap between face 83 and sleeve 44, there is a tendency for the superheated steam to flow toward rings 40–43. However, the tendency for the superheated steam to flow through all of the outboard rings 40–43 is reduced because the outboard rings have a greater area than of inboard rings 62–65; the greater area of the outboard rings causes a greater radial force to be exerted on them than on the inboard rings to provide a higher resistance for the flow of fluid through the outboard rings than through the inboard rings.

The superheated steam supplied by cavity 82 to ring 62 is at a sufficiently high pressure, approximately 25 psi greater than the pressure in disperser crusher 11, to establish superheated steam flow that forces virtually all of the coal particles that might reach packing ring 65 through the tortuous path comprising gaps 60 and 72 to be driven away from the sealing surfaces between packing rings 62–65 and sleeve 44. Also, the tortuous path forms an annular nozzle that directs the steam axially of the shaft toward casing 22 to further prevent migration of coal toward packing ring 65. Steam impinging on casing wall 22 is deflected away from shaft 21, also to reduce the tendency for coal particles to migrate into the tortuous path and the packing ring area.

Superheated steam, typically at a temperature on the order of 560° F., is employed because it is very dry and does not cause caking of packing rings 40–43 or 62–65. Further, superheated steam is very inert with respect to the coal particles, and does not cause the coal particles to become oxidized. By avoiding oxidation of the coal particles, the coal is not charred, whereby wearing of the contacting faces between the packing rings and the exterior surface of sleeve 44 is to a large extent obviated.

While there has been described and illustrated one specified embodiment of the invention, it will be clear that variations in the details of the embodiment specifically illustrated and described may be made without departing from the true spirit and scope of the invention as defined in the appended claims.

What is claimed is:

1. A seal for a shaft of a disperser crusher adapted to pulverize hot coal particles that are conveyed by hot gases to the crusher, said crusher being in a casing having a wall through which the shaft extends to a drive motor, said seal adapted to maintain a higher than atmospheric pressure established by the hot gases within the casing, comprising interior and exterior packings enclosed within interior and exterior packing housings fixed on and respectively inside and outside of said casing wall and each packing in abutting relationship with a high temperature resistant low friction coefficient sleeve on said shaft, means for urging each of the packings against said sleeve on said shaft to establish a seal between said sleeve and the casing wall, said packings being fabricated of a material capable of withstanding the elevated temperatures on the surface of the shaft, conduit means for supplying gas to the interior packing in a direction to urge the interior packing longitudinally of the shaft away from the casing wall, said conduit means in fluid flow relationship with means for establishing a tortuous path for the coal particles from the interior of the casing to the interior packing, wherein the tortuous path terminates in a generally annular nozzle for the gas, said nozzle directing the gas back over the interior packing housing toward a casing wall portion adjacent the seal, said gas being inert with the coal particles and having a pressure greater than the pressure inside of the casing whereby coal particles are continuously biased away from the packings by the gas emitted from the nozzle.

2. The seal of claim 1 wherein the area of the interior packing is less than the area of the exterior packing in planes at right angles to the shaft radius and longitudinal axis so that a greater compressive force, in the radial direction of the shaft, is applied to the exterior packing than to the interior packing to tend to prevent coal particles from migrating from the casing to the interior packing.

3. The seal of claim 1 wherein the conduit means and the means for urging the packings against the sleeve include a pair of split body mounting plates secured to the casing exterior and to each other, and further including a split ring secured to the plates urging the exterior packing toward the interior of the casing against a wall of the plates parallel to a wall of the casing.

4. The seal of claim 1 wherein the packings are graphite.

5. A seal as claimed in claim 1 wherein the sleeve on the shaft is a ceramic sleeve fixed on and integral with the shaft at the seal.

6. In combination, a disperser crusher for pulverizing hot coal particles that are conveyed to the crusher by hot gases, a casing for the crusher, a shaft extending through the casing wall to a drive motor, a seal for the shaft including exterior and interior packing housing portions on opposite sides of the casing wall, each of said housing portions having seals adapted to maintain a higher than atmospheric pressure established by the hot gases within the casing, each of said seals including: interior and exterior packings respectively inside and outside of said casing wall in said interior and exterior housing portions respectively and each in abutting relationship with the shaft, means for urging each of the packings against the shaft to establish a seal between the shaft and the casing, said packings being fabricated of a material capable of withstanding the temperature on the surface of the shaft, conduit means for supplying a gas to the interior packing in a direction to urge the interior packing longitudinally of the shaft away from the casing wall, said conduit means in fluid flow relationship with means for establishing a tortuous path for the coal particles from the interior of the casing to the interior packing wherein the tortuous path terminates in a generally annular nozzle for the gas, said nozzle directing the gas back over the interior packing housing toward a casing wall portion adjacent the seal, said gas being inert with the coal particles and having a pressure greater than the pressure inside of the casing whereby coal particles are continually biased away from the seals by the gas emitted from the nozzle.

7. The combination of claim 6 wherein the area of the interior packing is less than the area of the exterior packing in planes at right angles to the shaft radius and longitudinal axis so that a greater compressive force, in the radial direction of the shaft, is applied to the exterior packing than to the interior packing to tend to prevent coal particles from migrating from the casing to the interior packing.

8. The combination of claim 6 wherein the conduit means and the means for urging the packings against the sleeve includes a pair of split body mounting plates secured to the casing exterior and to each other, and further including a split ring secured to the plates urging the exterior packing toward the interior of the casing against a wall of the plates parallel to a wall of the casing.

9. The combination of claim 6 wherein the packings are graphite.

10. The combination of claim 6 further including a source of superheated steam connected in fluid flow relation with the conduit means.

11. The combination of claim 6 wherein the shaft includes a ceramic outer layer abutting against the packings.

12. A seal for a shaft of a disperser crusher adapted to pulverize hot coal particles that are conveyed by hot gases to the crusher, said crusher being in a casing having a wall through which the shaft extends to a drive motor, said seal adapted to maintain a higher than atmospheric pressure established by the hot gases within the casing comprising interior and exterior packing means enclosed within interior and exterior packing housings respectively inside and outside of said casing wall and each packing means in abutting relationship with a high temperature resistant sleeve on said shaft, means for urging each of said packing means against said sleeve to establish a seal between said sleeve and the casing, said packing means being fabricated of a material capable of withstanding the temperature on the surface of the shaft, a conduit means for supplying gas to the interior packing means in a direction to urge the packing means longitudinally of the shaft away from the casing wall, said conduit means in fluid flow relationship with means for establishing a tortuous path for the coal particles from the interior of the casing to the packing means, wherein the tortuous path terminates in a generally annular nozzle for the gas, said nozzle directing the gas back over the interior packing housing toward a casing wall portion adjacent the seal, said gas being inert with the coal particles and having a pressure greater than the pressure inside of the casing whereby coal particles are continually biased away from the seals by the gas emitted from the nozzle.

13. A seal as claimed in claims 1 or 6 or 12, wherein the nozzle is a reentrant nozzle extending from the shaft over a portion of the interior seal housing portion toward the casing wall.

14. A seal as claimed in claims 1 or 6 or 12, wherein said nozzle is an annulus formed between the inner housing and an annular ring fixed to and rotating with the shaft adjacent said inner housing.

15. A seal as claimed in claim 14 wherein the annular ring is L-shaped having a portion extending axially of the shaft over the inner housing to form an annular reentrant nozzle.

16. A method of sealing a shaft of a disperser crusher adapted to pulverize hot coal particles that are conveyed by hot gases to the crusher, said crusher being in a casing through which the shaft extends to a drive motor, a seal adapted to maintain a higher than atmospheric pressure established by the hot gases within the casing, said seal including: interior and exterior packings respectively inside and outside of the walls of said casing in abutting relation with a high temperature resistant low coefficient of friction sleeve on said shaft, means for urging each of the packings against said sleeve to establish a seal between said sleeve and the casing, said packings being fabricated of a material capable of withstanding the elevated temperature on the surface of the shaft, said method comprising supplying gas to the interior packing in a direction to urge the interior packing longitudinally of the shaft away from the interior of the casing wall, said gas being inert with the coal particles and having a pressure greater than the pressure inside of the casing and passing through a tortuous path through the interior packing and discharging said gas through an annular nozzle about the shaft toward a casing wall adjacent the seal whereby coal particles are continuously biased away from said packings by the gas emitted from said nozzle.

* * * * *

UNITED STATES PATENT AND TRADEMARK OFFICE
CERTIFICATE OF CORRECTION

PATENT NO. : 4,270,762

DATED : June 2, 1981

INVENTOR(S) : ROBERT T. JOHNSTON

It is certified that error appears in the above-identified patent and that said Letters Patent are hereby corrected as shown below:

Column 5, line 40, "5/8" should be --3/8--.

Column 6, line 51, "rignt" should be --right--.

Signed and Sealed this

Twenty-fifth Day of August 1981

[SEAL]

Attest:

GERALD J. MOSSINGHOFF

Attesting Officer

Commissioner of Patents and Trademarks